March 15, 1966
D. VOLK
3,239,967
LENS SURFACE GENERATOR
Filed July 2, 1963
8 Sheets-Sheet 5
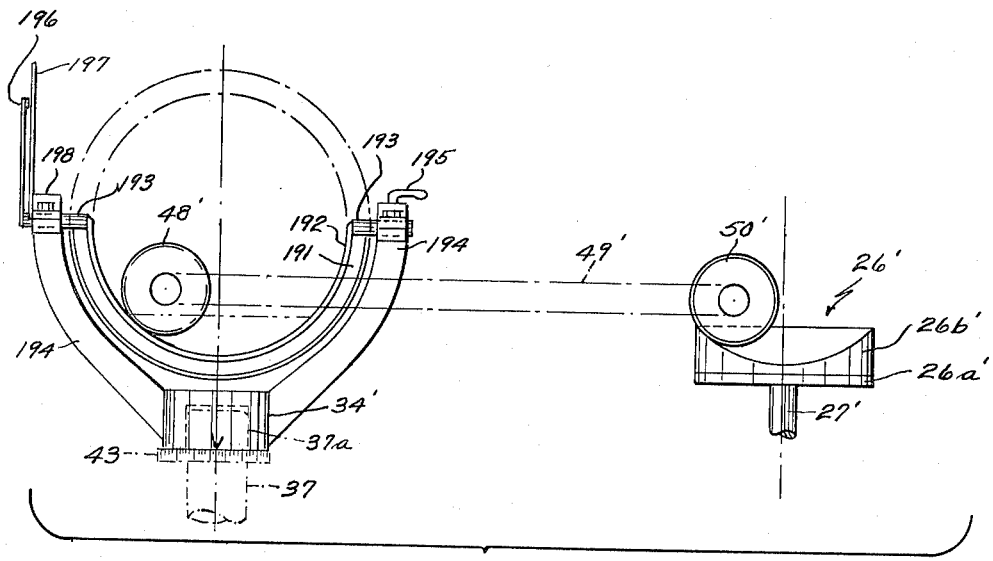
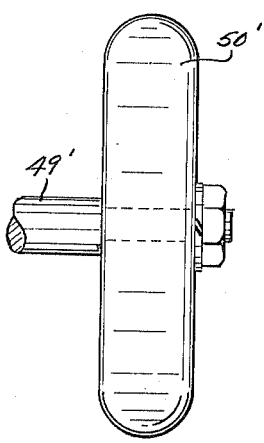
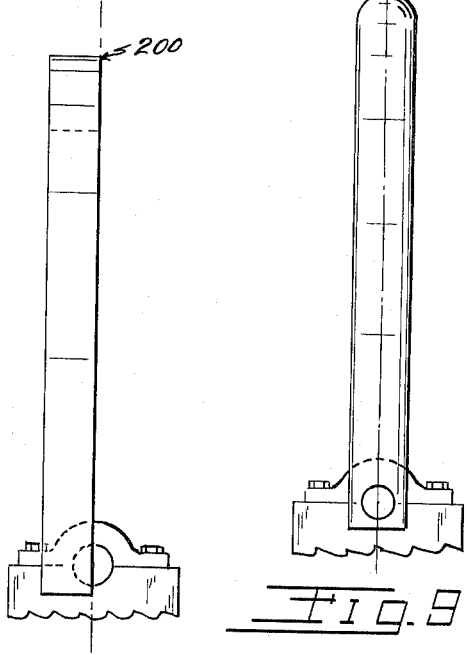
INVENTOR.
DAVID VOLK
BY
Meyer, Baldwin, Doran & Egan
ATTORNEYS March 15, 1966 D. VOLK 3,239,967
LENS SURFACE GENERATOR
Filed July 2, 1963 8 Sheets-Sheet 6

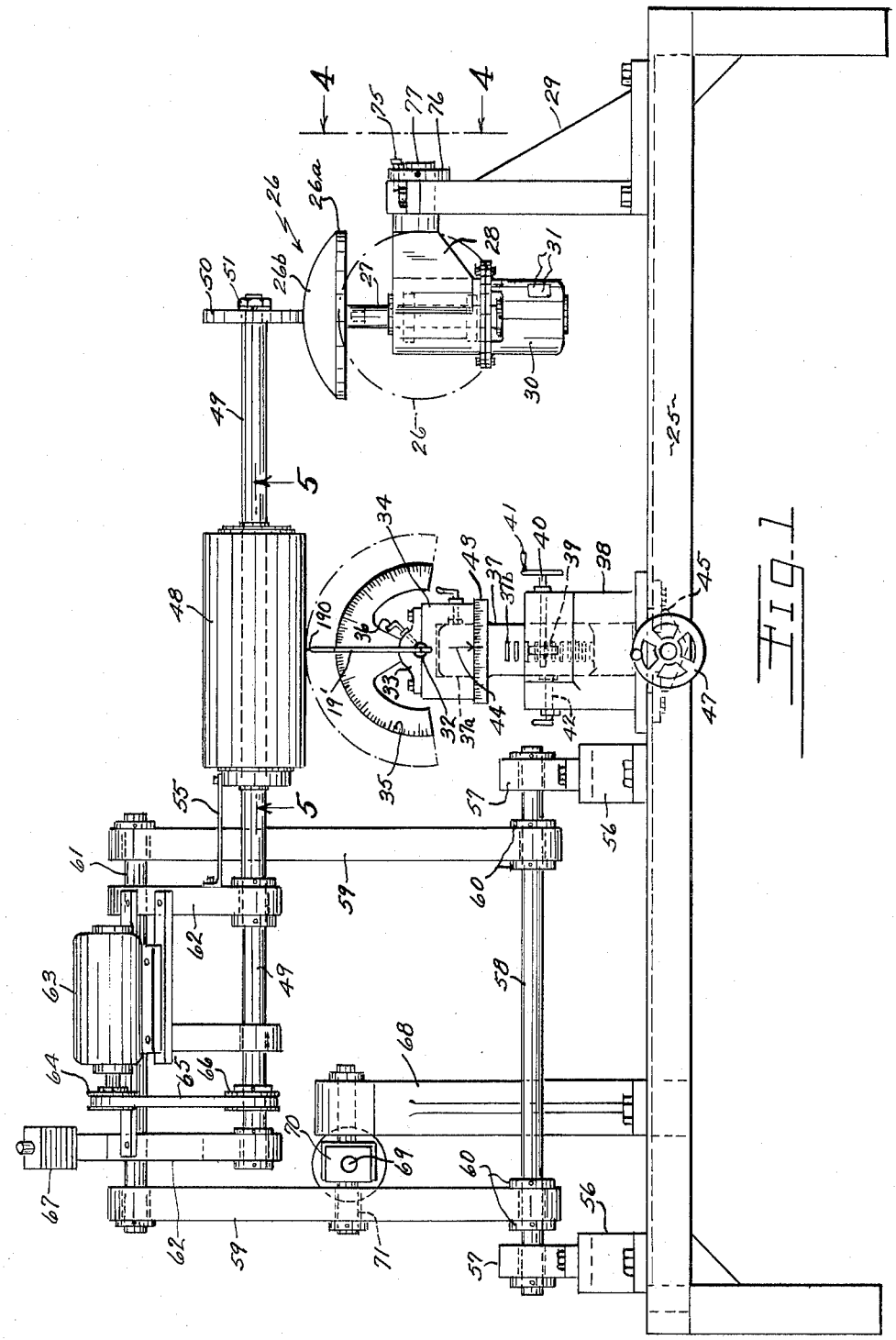

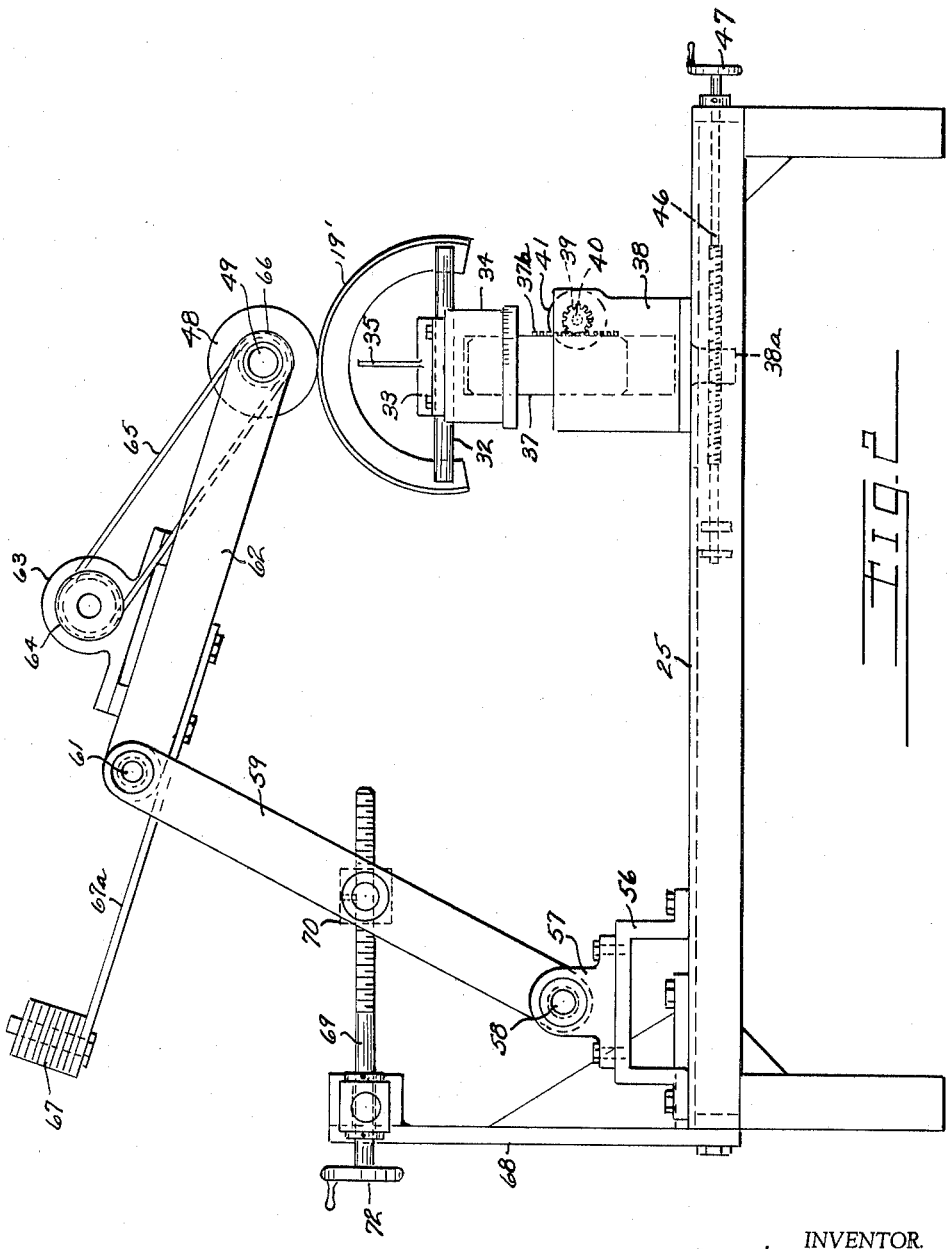

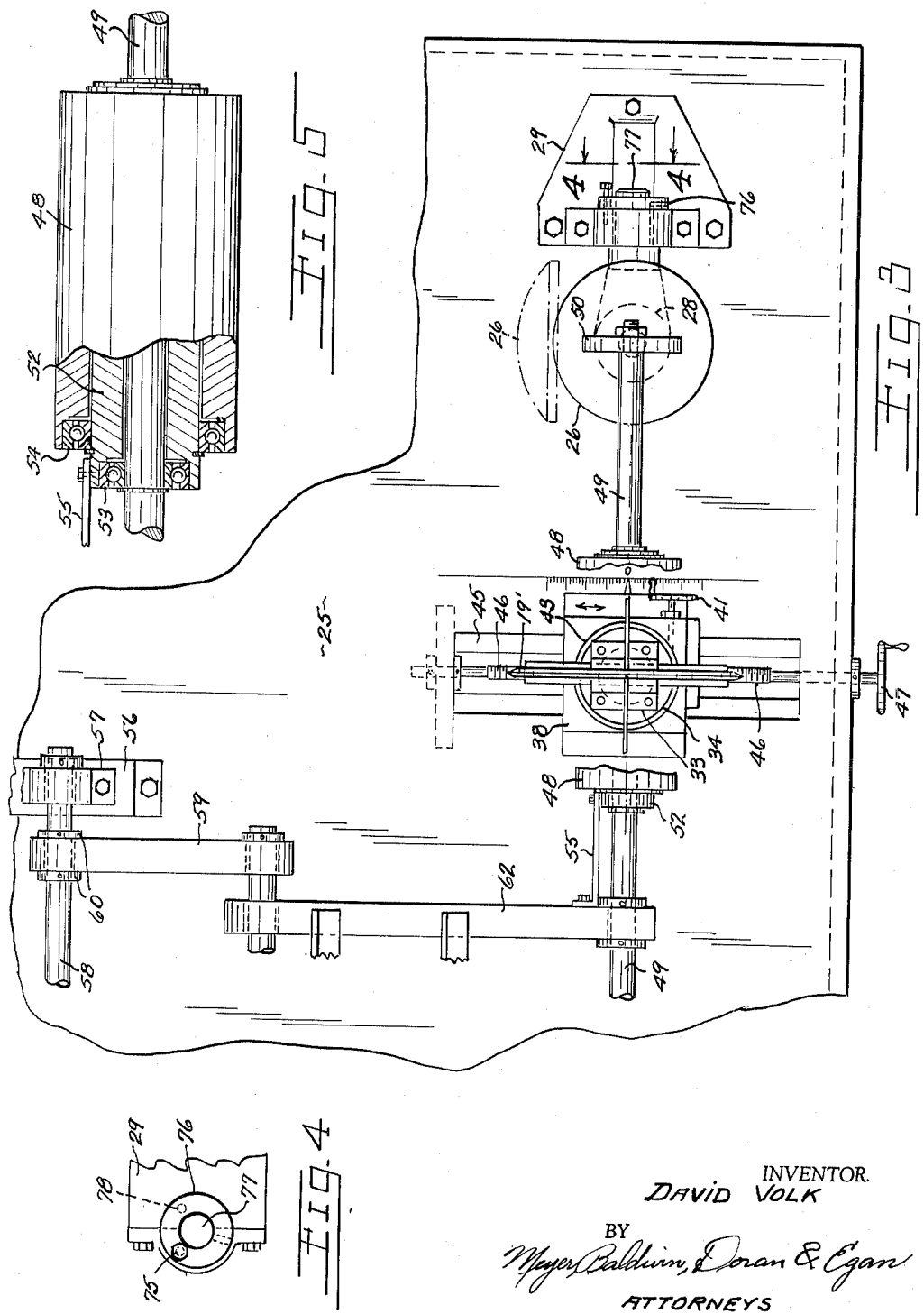

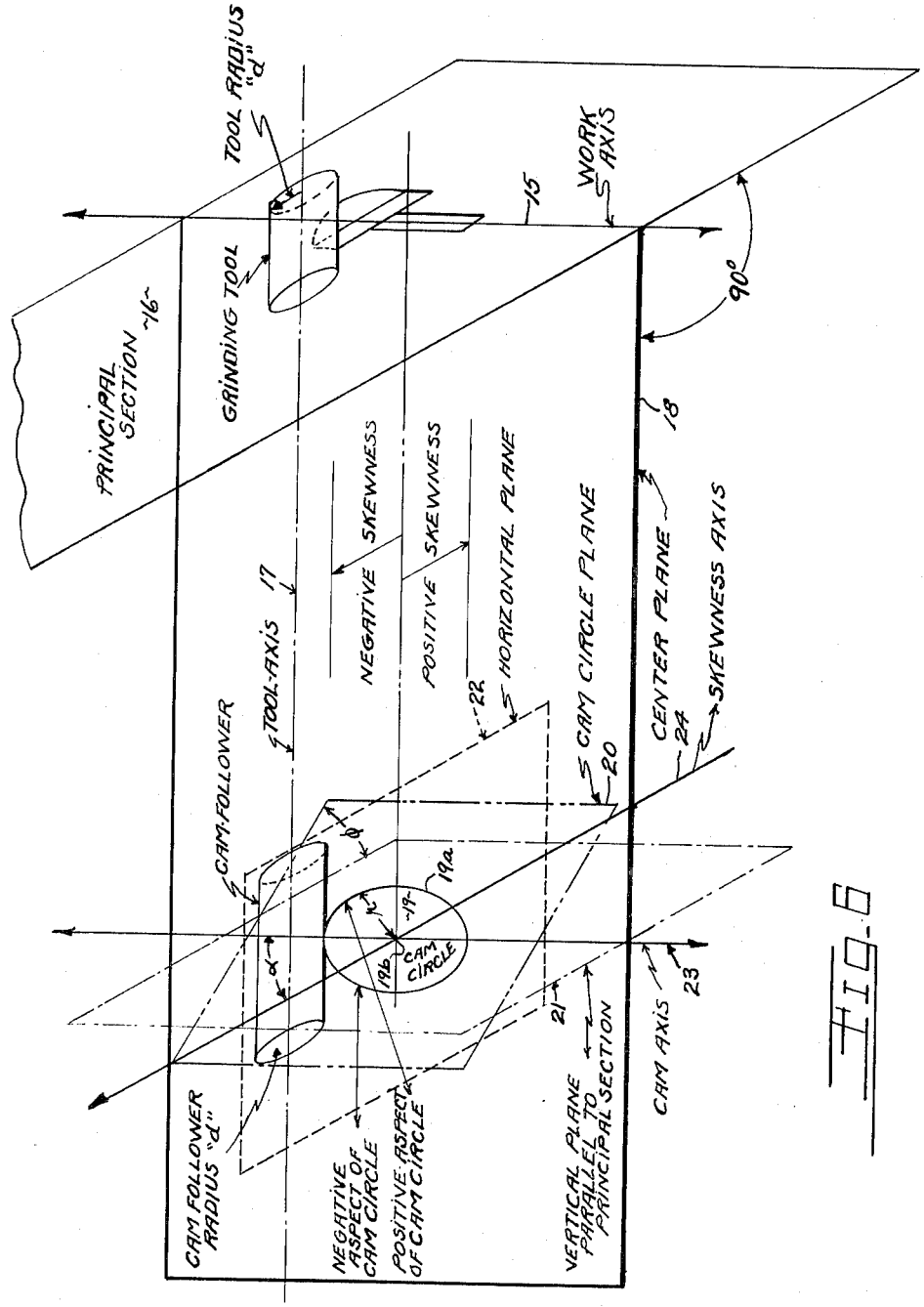

INVENTOR.
DAVID VOLK
BY Meyer, Baldwin, Doran & Egan
ATTORNEYS

March 15, 1966  D. VOLK  3,239,967
LENS SURFACE GENERATOR
Filed July 2, 1963  8 Sheets-Sheet 7

INVENTOR.
DAVID VOLK
BY
ATTORNEYS

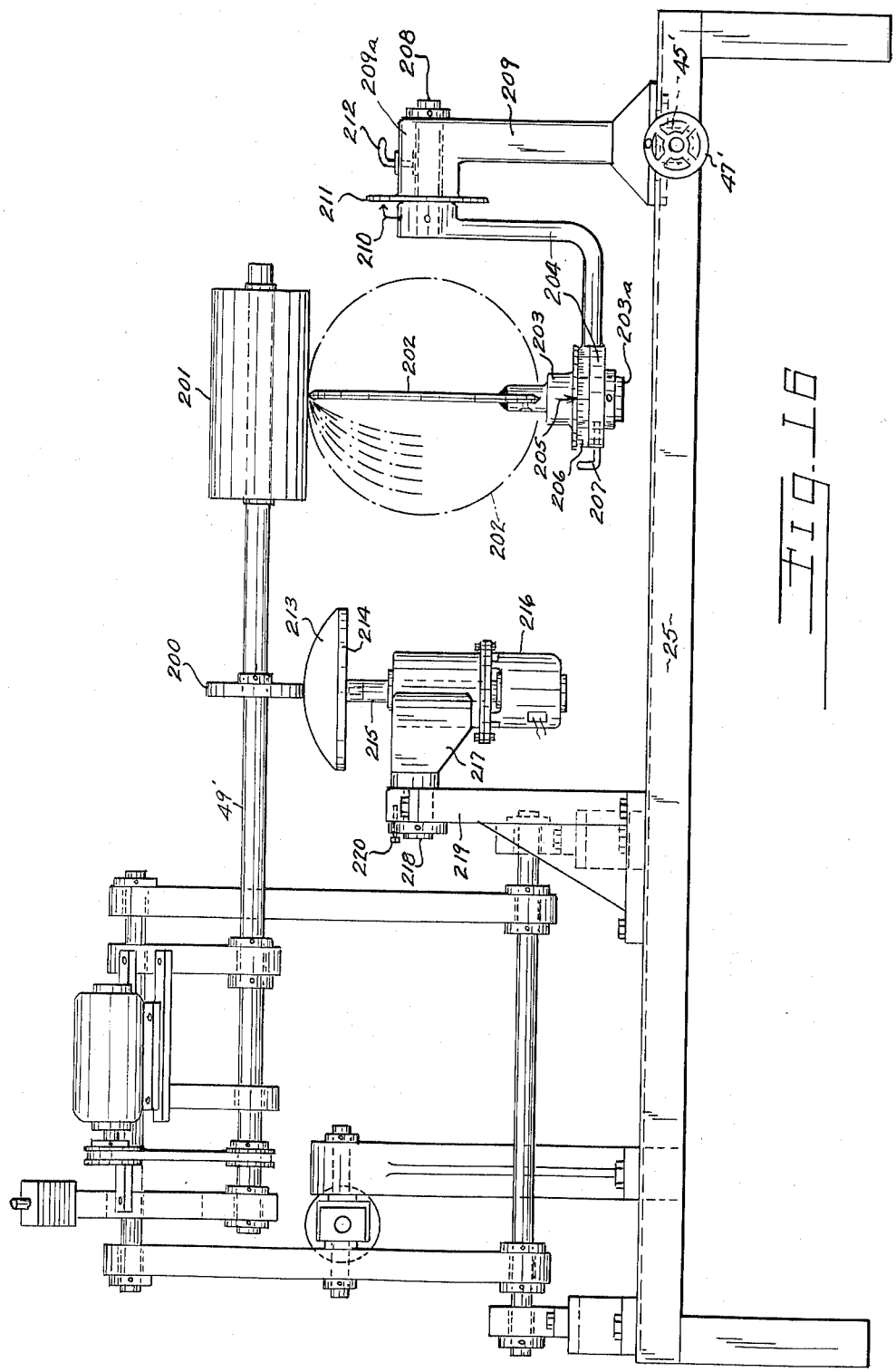

United States Patent Office 3,239,967
Patented Mar. 15, 1966

1

3,239,967
LENS SURFACE GENERATOR
David Volk, 3336 Kersdale, Pepper Pike, Ohio
Filed July 2, 1963, Ser. No. 292,380
16 Claims. (Cl. 51—100)

This invention relates to an improved cam-following generator and method to be used for the purpose of generating on optical material or metal: aspheric surfaces of revolution which are cup-shaped with either an apical umbilical point or an apical cusp, aspheric surfaces of revolution which are cup-shaped with neither an apical umbilical point nor an apical cusp, and saddle-shaped surfaces of revolution with and without an apical cusp. The sphere, a special case of a surface of revolution with an apical umbilical point, and cup-shaped and saddle-shaped toric surfaces, with their principal meridians circular, can also be generated by the new method.

This invention comprises in general the mounting of a work blank for rotation about a work axis, except when generating a surface on a fixed cam plate, providing a tool having a circularly cylindrical or toric material removing edge, together with the means for rotating this tool about its own tool axis which is the axis of symmetry of the tool, providing means for moving the tool and its axis in a curved path such that the tool axis always remains parallel to itself, with the aid of a circularly cylindrical freely rotatable cam follower concentric to the tool axis making line contact along a cam consisting of a generally circular edge of a hard plate, the said edge comprising a circular line or a circular or elliptical torus, the meridian profile of the surface generated depending upon the orientation, position and diameter of the generally circular edge of the plate along whose edges the cam follower moves. The cutting or grinding edge of the tool, revolving about the tool axis, contacts the work revolving about the work axis, removing material from the work as the tool moves in a curved path which is controlled by the cam.

Using the aforementioned cam, the generator of this invention is capable of producing:

(1) Cup-shaped surfaces of revolution with an apical umbilical point including prolate and oblate ellipsoid surfaces of revolution, and other surfaces resembling prolate and oblate ellipsoids, paraboloids, and hyperboloids of revolution, and which include as a special case the sphere;

(2) Cup-shaped surfaces of revolution with an apical cusp which resemble the surfaces in (1) above, and which include as a special case the spindle torus;

(3) Cup-shaped surfaces of revolution without an apical umbilical point or cusp including elliptical toroids, in which one of the principal meridians is non-circular, having either a prolate or an oblate elliptical profile, and other cup-shaped surfaces resembling elliptical toroids;

(4) Saddle-shaped surfaces of revolution with and without an apical cusp, including elliptical toroids in which one of the principal meridians is non-circular, having either an oblate or prolate elliptical profile, and other saddle-shaped surfaces resembling saddle-shaped elliptical toroids, and which include as a special case the saddle-shaped torus;

(5) Elliptical cylinders and similar surfaces;

(6) Templates to match the surfaces producible by this invention;

(7) Cams for generators which employ cam followers

2 for the purpose of generating aspheric surfaces of revolution; and (8) Tools and laps for use in generating or grinding aspheric surfaces of revolution by techniques other than the direct use of my improved generator.

In the drawings—

FIG. 1 is a side elevational view of one form of apparatus adapted to carry out many of the purposes of the present invention;

FIG. 2 is an end elevation of the same taken at the left-hand end of FIG. 1 and omitting views of the grinding tool and workholder for clarity;

FIG. 3 is a fragmental top plan view of the apparatus of FIGS. 1 and 2;

FIG. 4 is a fragmental elevational view taken along the line 4—4 of FIG. 3;

FIG. 5 is an enlarged view of the cam follower roller of FIG. 1 with parts broken away to more clearly show the construction;

FIG. 6 is a diagrammatic view illustrating certain lines, planes and position of parts necessary to understand this invention;

FIG. 7 is a fragmental elevational view showing a variation of the grinding tool of FIG. 1;

Figures 10A, 10B, 10C, 10D:
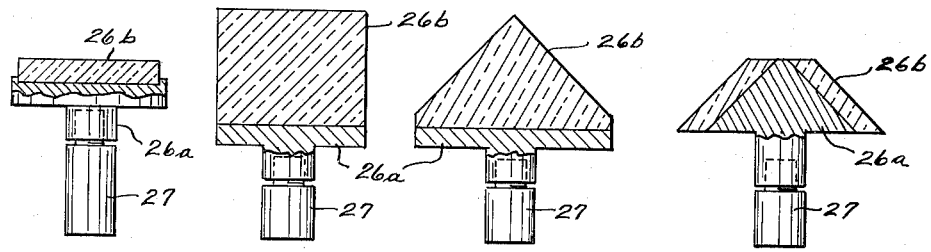
Figures 10E, 10F, 10G, 10H:
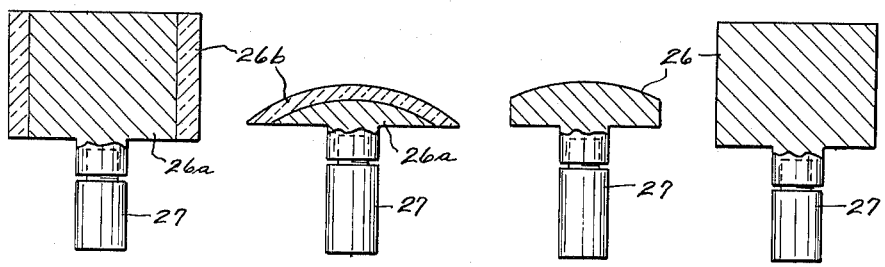
Figure 11:
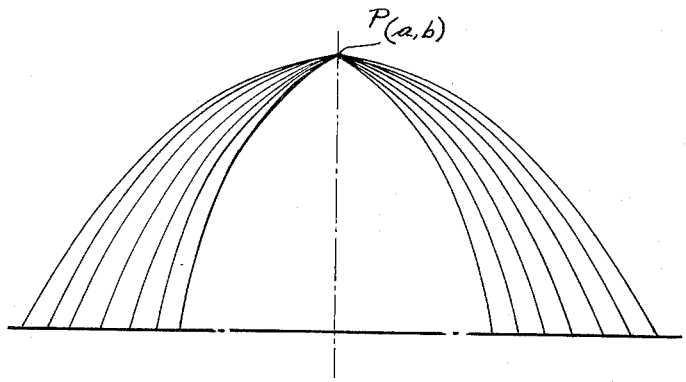
Figure 14:
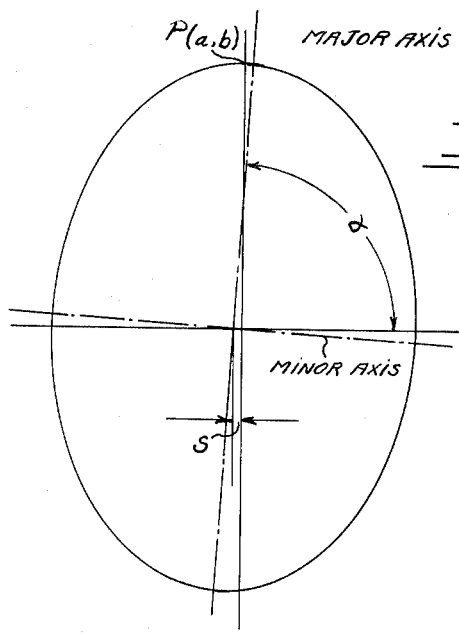
Figure 13:
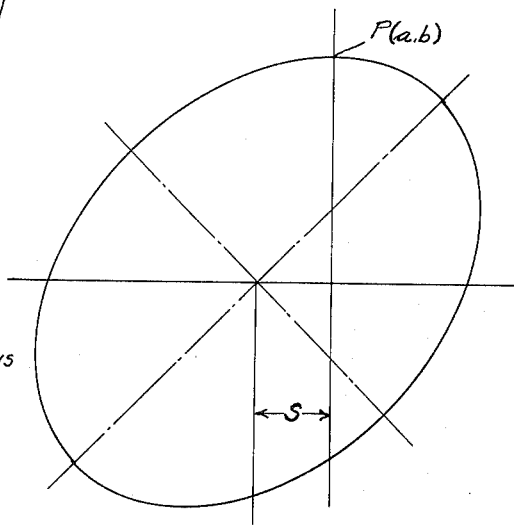
Figure 15:
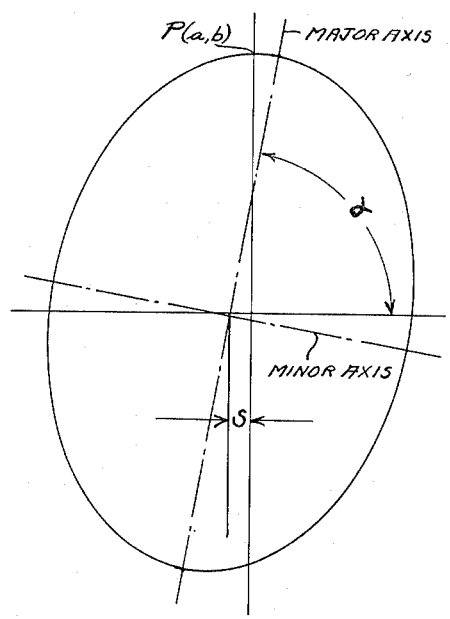

FIGS. 8 and 9 are elevational views showing modifications of the cam shown in the central portion of FIG. 1; FIG. 8 showing a cylindrical cam having a sharp shoulder in line with the tilting axis of the cam; FIG. 9 showing a toric edge on the cam;

FIG. 10A through 10H are sectional views through various workholders which may be substituted for the workholders shown in FIG. 1;

FIG. 11 shows possible variations of the elliptical trace in the principal section of a generated optical surface made by simultaneously varying the azimuth $\alpha$ and skewness $s$ while maintaining constant the point P $(a, b,)$ where the trace intercepts the work axis;

FIG. 12 is a somewhat schematic view showing a modified cam and modified workholder which may be substituted in FIGS. 1, 2 and 3;

FIG. 13 is a diagram illustrating an elliptical planar projection of the cam circle onto the principal section wherein the cam is asymmetrical with respect to the center plane;

FIG. 14 is a diagram illustrating the position of an ellipsol when using this invention to obtain the data of Table 1;

FIG. 15 is a diagram illustrating the position of an hyperbolol when using this invention to obtain the data of Table 2; while FIG. 16 is a side elevational view having some resemblance to FIG. 1 and illustrating another embodiment which the machine of this invention may take.

In order to simplify the description of this invention, the edge of the cam along which the cam follower moves can be practically reduced to a circular line. It is to be understood that circular and elliptical cross-sectioned toric edges of the cam and other regularly curved surfaces on the edge of the cam are included as a part of this invention. Wherever in the specification and claims I use such terms as cam "circle," "circular" cam, and cam "circular" edge, I mean to include, unless otherwise indicated, a cam or edge having some axial dimensions, as caused by wear, or by the use of a circular or elliptical torus edge as illustrated in FIG. 9 as long as the surfaces generated are acceptable optical surfaces of the type described, including ophthalmic.

The principle upon which this invention is based is that the planar projector of a circle oblique with respect to the said plane, is an ellipse. Thus, if a circularly cylindrical cam follower whose straight line surface elements are oriented in a fixed direction, moves along the circular edge of a cam, the motion of the cam follower will depend upon the inclination of the plane of the circular edge of the cam with respect to the said direction. Thus the effective shape on the cam follower path of a cam with an edge consisting of a tilted circular line is always an ellipse, and in the special case in which the plane of the circle is perpendicular to the surface elements of the cam follower, (i.e., not tilted) the effective shape of the cam is a circle.

The effective shape of the cam can be described in terms of the eccentricity $e$ of the planar projection of the circular edge of the cam:

$$e = \sin \phi \qquad (1)$$

where $\phi$ is the inclination of the plane of the circular edge with respect to a plane normal to the tool axis, $e$ varying from 0 to 1 as the inclination varies from 0° to 90°. Along the ellipse the curvature changes continuously from the maximum at the ends of the major or transverse axis, the prolate points, to the minimum at the ends of the minor or conjugate axis, the oblate points. At any point $P(a, b)$, where $a$ is the coordinate in the direction of the semi-major axis, of length A, and $b$ is the coordinate in the direction of the semi-minor axis of length B, the origin being the geometrical center of the ellipse, the radius of curvature is given by the equivalent expressions:

$$r_{P(a,b)} = \frac{(A^4 b^2 + B^4 a^2)^{\frac{3}{2}}}{A^4 B^4} \qquad (2a)$$

$$r_{P(a,b)} = \frac{(b^2 + a^2 \cos^4 \phi)^{\frac{3}{2}}}{A^2 \cos^4 \phi} \qquad (2b)$$

$$r_{P(a,b)} = \frac{(b^2 + a^2(1 - e^2)^2)^{\frac{3}{2}}}{B^2(1 - e^2)} \qquad (2c)$$

where $B = A \cos \phi$. By setting $b = 0$, the radius of curvature $r_{\text{prolate}}$, at the ends of the major axis, the prolate points, is obtained, and by setting $a = 0$, the radius of curvature $r_{\text{oblate}}$, at the ends of the minor axis, the oblate points, is obtained.

The major axis of the elliptical projection of the cam corresponds to the diameter of the circle about which the circular edge of the cam has been inclined. For example, the major axis of the ellipse, of a length equal to the diameter of the circular cam, will be horizontal if the cam is inclined about a horizontal diameter, and vertical if the cam is inclined about a vertical diameter, the said diameter being parallel to the said plane of projection.

In the process of generating surfaces of revolution by this invention, the work which consists of a lens or mirror blank of glass, plastic or other optical material, or metal, is mounted by means of pitch or other adhesive, or by mechanical means to a lens blank holder. Various forms of the holder are shown in FIGS. 10A to 10H. The lens mirror blank holder is then attached by taper fit or by screw thread to a revolving axle or shaft in such a way that there is a common axis of revolution, hereinafter called the work axis for the axle, lens blank holder, and work. If the surface is to be generated on metal, the lens blank or other optical material is replaced by the desired piece of metal of appropriate size, or the blank holder and work may be constructed of a solid piece of metal as in FIGS. 10G and 10H. The work piece must overlay the work axis if the generated surface is to include an actual apical umbilical point or cusp.

In one form, the grinding tool consists of a circular cylinder having diamond dust bonded to its outer surface as shown in FIG. 1. In another form, the grinding tool is a torus with diamond dust bonded to its outer surface as shown in FIG. 7. It will be shown that the circular cylinder form of the tool is best adapted for the generating of cup-shaped and saddle-shaped surfaces of revolution, whereas the torus form of tool is that required for the generating of surfaces of revolution having negative curvature.

The term "generated" as used in this invention means formed by means of the cutting or grinding edge of circularly cylindrical and toric edged wheels which maintain contact with the work piece as it revolves about its axis of revolution, in at least a point during the generating process, the generated surface and cutting or grinding surface of the tool being noncomplementary when the cup-shaped surfaces are generated; while the generated surface and the cutting or grinding edge of the toric tool are generally complementary when negative surfaces of revolution are generated.

When saddle-shaped surfaces of revolution are generated, the generated surface and cutting or grinding edge of the tool are generally complementary in one of the principal directions of the work surface but not in the other principal direction.

In order to follow the description of the generation of surfaces of revolution by this invention, certain lines, planes, angles and motions and their relative orientations, dimensions, and direction will be defined, with reference to FIG. 6, although the actual orientation in space of the total generator is arbitrary.

A line 15 (see FIG. 6) lying in a vertical plane hereafter called the principal section 16 and serving as the axis of revolution about which the work revolves is called the work axis. Another line 17, perpendicular to the principal section, about which the tool revolves, is the tool axis. Although this invention includes all directions of the work axis within the principal section, in the description now to be given, the work axis shall be limited to the vertical direction, and the work surface shall generally be facing upward. In a later description, an example will be given in which the work axis is other than vertical. A vertical plane 18 containing the vertical work axis and perpendicular to the principal section is called the center plane. The circular line edge 19a of the cam 19 is called the cam circle, and its radius is given as $r$. The plane 20 of the cam circle is called the cam plane and the acute angle which it forms with the principal section, or with the plane 21 parallel to the principal section, is called the inclination, and it is symbolized by $\phi$. In this description, $\phi$ will always be a positive angle, increasing as the positive or upper aspect of the cam circle moves toward the principal section, although in the actual generation no restriction need be placed upon the orientation of $\phi$. The acute angle between a horizontal plane 22 and the diameter of the cam circle, hereafter called the cam circle axis 23, about which the inclination has occurred, and measured in a clockwise direction is called the azimuth, and it is symbolized by $\alpha$. The distance between the center of the cam circle 19b and the center plane 18 is called skewness and it is given the symbol $s$. The horizontal line of motion along which the center of the generating circle moves in the adjustment of skewness is called the "skewness axis" 24. Skewness is defined as negative when the center of the cam circle is to the left of the center plane as one looks along the center plane with the cam circle lying between the observer and the principal section (as viewed in FIG. 6), and positive when the center of the cam circle is to the right of the center plane. The cam circle is likewise arbitrarily divided into positive and negative aspects, referring to the parts nearer to and farther from the observer, respectively, facing FIG. 6.

Apparatus illustrating the principles of this invention and adapted to carry out many of the functons described herein is shown in FIGS. 1 through 5, inclusive. On a suitable base 25 is mounted a workholder 26 which may be of any suitable character to hold optically useful material for shaping by the method and apparatus of this invention. One such workholder is shown in FIG. 1 and other suitable workholders are shown in FIGS. 10A through 10H. The workholder 26 comprises a lens mounting member 26a in which is mounted in any suitable manner lens material such as glass or plastic indicated at 26b. The mounting member 26b is preferably circular in form and carries rigidly with it a central work rotating shaft or stem 27 which is rotatably mounted in a bracket 28 which, in turn, is supported on a bracket 29 bolted to the base 25. The bracket 28 may be immovable with respect to bracket 29 for certain purposes, although, as later described in connection with FIG. 4, it may be moved to various positions for other purposes. Means is provided for rotating the shaft 27 and thereby rotating the optical material 26b during the generation of a lens surface as hereinafter described. This may take various forms but is here shown as a motor 30 bolted to the bracket 28 and directly connected to the work drive shaft 27. Electrical power is supplied through the conductors 31.

The heart of this invention is the use of a generally circular cam, or at least a portion thereof, inclined in one or more directions and then the use of that circle projected on a plane parallel to the principal section of the surface to be generated to use the same as a pattern for the lens surface. For ease of mounting and manipulation, I have shown in FIGS. 1, 2 and 3 a convex cam 19' extending in a circular arc of somewhat more than 180°, sufficient for carrying out the purpose of this invention yet easy to mount and manipulate. Diametrically across the circular arc 19' is fixed a horizontal pivot pin 32 which is mounted for rotation in a bearing cap 33 secured to sub-base member 34. The cam 19', as viewed in FIG. 1, may be moved to the right approximately 90° and indicia 35 provided to read the angle of adjustment which position is firmly held by means of lock pin 36 threaded through the bearing cap 33 and abutting against the pivot pin 32.

The cam 19' and pivot pin 32, along with its bearing and bearing cap 33 and sub-base 34, may also be rotated around a vertical axis perpendicular to the axis of the pivot pin 32 at the center of the circular cam. The adjustment range is 90°, the zero position being represented in FIG. 1 by arrow 44 with the pivot pin 32 perpendicular to the tool axis, the angle increasing as the near end of the pivot pin 32 moves toward the right. It is to be understood that the same effects can be obtained with the cam as shown in FIG. 1 with motion of the near end of the pivot pin 32 toward the left. Referring to FIG. 1, this adjustment is provided by having a central cylindrical bore in the member 34 into which fits the upstanding end 37a of a vertical column 37, the lower portion of which is a square section and fits into base 38 for vertical adjustment. This base 38 is in turn suitably secured to the main base 25. Vertical adjustment of the column 37 relative to the base member 38 may be provided in any suitable manner. As here shown, rack teeth 36 are formed on member 37 meshing with a pinion 39 which is fixed to a shaft 40 having suitable bearings in the member 38. Shaft 40 is turned by hand wheel 41 so as to raise and lower the column 37 relative to the member 38. Any desired vertical adjustment is held in fixed position by a threaded screw 42 which abuts against the column 37. By appropriate combinations of the two adjustments of the cam circle 19', about a horizontal diameter as represented by the axis of symmetry of pivot pin 32, and about a vertical axis as represented by the axis of symmetry of the column portion 37a, the desired adjustments of azimuth and inclination can be obtained. Setting of azimuth α and inclination φ are made using scales 35 and 43 using well known mathematical relationships.

For purposes of adjusting skewness as later described, the member 38 may be mounted on ways 45 fixed to the base 25 for movement laterally relative to the workholder 26 and generally parallel to the pivot pin 32. A screw 46 rotatable in the base 25 and engaging in a nut 38a rigid with and depending from the member 38 serves by rotation of the hand wheel 47 in the usual fashion to move the member 38 from left to right as viewed in FIG. 2.

For the purposes of this invention, it should be understood that the workholder 26 might be on the left-hand side of the cam 19' as viewed in FIG. 1 and that the provision for relative vertical movement as between the workholder and the cam might be provided on the workholder rather than on the cam as here illustrated.

Means is provided for removing the optical material 26b by a suitable operation such as grinding utilizing as a pattern the circular cam 19' having the azimuth adjustment α and/or the rotational inclination adjustment φ and with or without a skewness adjustment as hereinafter more fully explained. To obtain the equivalent of the projection of the circular arc cam 19' on a vertical plane parallel to the principal section of the optical surface to be generated, which would be the projection on the plane 21 of FIG. 6 which is parallel to the principal section plane 16, I use an elongated cam follower roller which is rotatably mounted upon a shaft 49, the center line of which is the tool axis 17 mentioned in connection with FIG. 6. A circular grinding tool 50 is mounted on the end of shaft 49 and held by means of a nut connection 51 for rotation with shaft 49. The grinding wheel 50 shown in FIG. 1 has a cylindrical peripheral edge in which is embedded diamond dust or the like in the well known manner. Other forms of grinding tool will be hereinafter referred to. The cam follower 48 has sufficient axial length as to enable it to roll over the cam 19' in an inclined position like that shown at 19 in FIG. 6, while at all times maintaining the shaft 49 in parallel positions, without the roller 48 falling off the cam 19'.

Since shaft 49 will be rotating at high speed, and it is desired that the cam follower roller 48 have substantially only that rotation caused by its rolling action over the cam 19', means is preferably provided to prevent the transmission of rotational movement from shaft 49 to the cam roller 48 as shown in FIG. 5. Here a sleeve 52 surrounds without touching the shaft 49 and has a ball bearing 53 interposed between the sleeve and shaft 49. The cam roller 48 then surrounds the sleeve 52 without touching the same and is supported thereon by a ball bearing 54. If necessary or desirable, a brace 55 may be fixed between arm 62 and sleeve 52 as shown in FIGS. 1 and 5 to make certain that sleeve 52 does not rotate.

Means is provided for causing the cam follower roller 48 to roll over the tilted circular cam 19' while causing the grinding tool 50 to follow the same pattern and grind away the optical material 26b in the workholder. During this operation the tool shaft 49 is caused to move into various positions all parallel to each other which is the equivalent of causing the tool 50 to follow the pattern of a tilted circle projected on a vertical plane 21 as described in FIG. 6. Any suitable means may be used, but as shown herein, a pair of seats 56 bolted to the base and bearings 57 are bolted to their respective seats and a shaft 58 is rotatably mounted in the bearings. Parallel links 59 are rotatably mounted on shaft 58 and held in position by collars 60. At their upper ends, links 59 support shaft 61 which in turn carries a pair of parallel links 62 extending at an angle to the links 59 as seen in FIG. 2. These links are freely rotatable on shaft 61. At their outer ends, links 62 mount shaft 49 for rotation therein by means of motor 63 which is here shown as mounted on the links 62 although the motor might be connected in any other suitable position in order to provide its driving function. As here shown, the motor drives a pulley 64 which through belt 65 drives a pulley 66 rigidly fixed to shaft 49. Preferably, a counter weight is provided at 67 so as to substantially balance the weights on opposite sides of the shaft 61. To accurately control the position of shaft 49, cam follower 48 and grinding wheel 50, a bracket 68 is fixed to the base 25 and carries at its upper end a rotatably mounted screw 69 which has a threaded connection with a nut 70 which is mounted by a trunnion 71 in one of the links 59. Rotation of the screw 69 by means of the hand wheel 72 then varies the angular position of the links 59 with respect to the base 25 so as to carry the cam follower 48 in any desired direction as it rolls across the cam 19'. Thus, energization of motor 63 will cause shaft 49 and grinding wheel 50 to rotate rapidly as the grinding wheel follows the pattern provided by the cam follower 48 rolling over the cam 19'.

The tool shaft 49, concentric to the tool axis 17, has attached to it the griding wheel 50 of radius $d$, and rotatably mounted on the same shaft is the cam follower also concentric to the tool axis, with its radius, in this embodiment, equal to the outer radius $d$ of the generating tool.

The cam consists of a circular disc 19', as in FIGS. 1 to 3, of hard material, such as steel, or a circular edge of an outlined space within a plate as seen in FIG. 12, depending upon whether the cam is to roll on a convex or concave curve. The edge of the plate 19' may be a circular line as in FIG. 1, or a square edge on the cam axis as in FIG. 8, or toric edge as in FIG. 9.

The disc or plate can be oriented and positioned in one of an infinite number of fixed positions after which the cam follower 48 rolling across the edge of the disc or plate causes the generating wheel 50 to follow a course parallel to that of the cam follower, material being removed from the work piece 26b while it is rapidly rotating about the work axis 15, by the generating tool rapidly rotating about the tool axis 17.

With this method where the circular line or toric edge of a suitably oriented and positioned circular disc serves as a cam, it is possible to produce a wide variety of surfaces of revolution as well as surfaces not of revolution.

In order to understand the principles of this invention, several examples of surfaces which can be generated will be given.

The simplest case of a positive surface of revolution generated by the method of this invention is the sphere. With the work axis vertical and the surface to be generated facing upwards, the plane 20 is made parallel to the principal section 16.

The center of the cam circle lies in the center plane 18 and the uppermost portion of the cam circle is at about the same vertical level as the uppermost portion of the work piece. As the cam follower rolls along the convex circular edge of the cam, the grinding or cutting edge of the tool rapidly rotating about the tool axis contacts the work, rapidly rotating about the work axis, removes material during the passage of the cam follower across the cam, so that a sphere of radius $r$ will be generated. At all times, by means of the appropriate linkages, the tool axis remains parallel to itself and to the center plane.

As viewed in FIG. 6 azimuth $\alpha$ is measured positively, i.e., in a clockwise direction of movement of cam axis 23 away from a horizontal plane. Inclination $\phi$ (in the same figure) is measured positively in the direction of movement of the near edge of the cam 19 toward the right.

In another example of a positive surface of revolution generated by the method of this invention, the inclination $\phi$ is set at zero, while skewness $s$ is set at some positive value less than $r$. If the cam follower runs along the positive aspect of the cam circle, a toric surface without an apical cusp will be generated, whereas if the cam follower moves along the negative aspect of the cam circle, a toric surface with an apical cusp will be generated.

For positive values of $s$ greater than $r$, toric surfaces without an apical cusp can be generated when the cam follower runs along the positive aspect of the cam circle. Should $s>(r+d)$, then a saddle-shaped toric surface can be generated when the cam follower runs along the negative aspect of the cam circle. If $(r+d)>s>r$, then a saddle-shaped toric surface with an apical cusp will be generated when the cam follower runs along the negative aspect of the cam circle, the work surface facing either up or down.

Another example of a positive surface of revolution generated by the method of this invention is the prolate ellipsoid. With the variables adjusted as follows:

$s=0$ $\alpha=90°$ $\phi=\sin^{-1}e$, where $e$ is the desired eccentricity of the prolate ellipsoid $$r = \frac{r_{\text{prolate}}}{1-e^2}$$

where $r_{\text{prolate}}$ is the desired radius of curvature at the prolate umbilical point and with the work surface facing upwards, and with its uppermost portion at about the level of the top of the cam, the cam follower rolls along the upper convex edge of the cam 19' as the grinding tool 50, rotating rapidly about the tool axis, contacts the work piece, rotating rapidly about the work axis 15, removing material from the work as the cam follower moves along the cam, and thus generating the desired prolate ellipsoid.

Another example of a positive surface of revolution generated by the method of this invention is the oblate ellipsoid. With the variables adjusted as follows:

$s=0$ $\alpha=0°$ $\phi=\sin^{-1}e$, where $e$ is desired eccentricity of the ellipsoid $r=r_{\text{oblate}}(1-e^2)$  $r_{\text{oblate}}(1-e^2)^{1/2}$, where $r_{\text{oblate}}$ is the desired radius of curvature at the oblate umbilical point and with the work surface facing upwards, and with its uppermost portion at about the level of the top of the cam 19', the cam follower 48 rolls along the upper convex edge of the cam as the grinding tool 50 rotating rapidly about the tool axis, contacts the work piece, rotating about the work axis 15, removing material from the work as the cam follower moves along the cam, thus generating the desired oblate ellipsoid.

If, in the above example for the generation of the prolate ellipsoid, $0<|-s|<r \cos \phi$, a spindle-shaped surface with an apical cusp will be generated, as the cam follower proceeds along the positive aspect of the cam circle. The meridian profile will resemble that the of the prolate ellipsoid except that it will be narrowed by a distance $2s$. If the cam follower proceeds along the negative aspect of the cam circle, a cup-shaped surface without an apical cusp or apical umbilical point will be generated. The meridian profile will resemble that of the prolate ellipsoid except that it will be widened by a distance $2s$. If $r \cos \phi<s<r \cos \phi+d$, a cup-shaped surface without an apical cusp or apical umbilical point will be generated as the cam follower proceeds along the positive aspect of the cam circle, while a saddle-shaped surface with an apical cusp will be generated if the cam follower proceeds along the negative aspect of the circle, the work facing up or down; it being understood that if gravity does not hold the follower in contact with the cam, mechanical means will be utilized to do so. If $s>r \cos \phi+d$, a cup-shaped surface without an apical umbilical point of apical cusp will be generated as the cam follower proceeds along the positive aspect of the cam circle while a saddle-shaped surface without an apical cusp will be generated as the cam follower proceeds along the negative aspect of the cam circle. In the special case in which $s=r/(1-e^2)$, as the cam follower proceeds along the positive aspect of the cam circle, an elliptical torus will be generated, in which there is a circular umbilical line, a meridian section being a portion of an ellipse symmetrical to the plane of the umbilical line, with an oblate point at the umbilical line.

If, in the previous example of the generation of an oblate ellipsoid, $0<|-s|<r$, a spindle-shaped surface with an apical cusp will be generated as the cam follower proceeds along the positive aspect of the cam circle. The meridian profile will resemble that of the oblate ellipsoid except that it will be narrowed by a distance $2s$. If $0<s<r$, or if $s>r$, and the cam follower proceeds along the positive aspect of the cam circle, a cup-shaped surface without an apical umbilical point or apical cusp will be generated. The meridian profile will resemble that of the oblate ellipsoid except that it will be widened by a distance $2s$. If $r<s<r+d$, a cup-shaped surface without an apical cusp or apical umbilical point will be generated as the cam follower proceeds along the positive aspect of the cam circle, while a saddle-shaped surface with an apical cusp will be generated as the cam follower proceeds along the negative aspect of the cam circle, the work facing either up or down. If $s>r+d$, a cup-shaped surface without an apical umbilical point or apical cusp will be generated as the cam follower proceeds along the positive aspect of the cam circle while a saddle-shaped surface without an apical cusp will be generated as the cam follower proceeds along the negative aspect of the cam circle. In the special case in which $s=r(1-e^2)$, as the cam follower proceeds along the positive aspect of the cam circle, an elliptical torus will be generated in which there is a circular umbilical line, a meridian section being a portion of an ellipse symmetrical to the plane of the umbilical line, with a prolate point at the umbilical line.

In the generation of both prolate and oblate ellipsoids by the method of this invention, $s$ must be set at zero, and $\alpha$ must be either 90° or 0°. Surfaces of revolution with apical umbilical points, other than prolate and oblate ellipsoids, can be generated by the method of this invention by the appropriate combination of $r$, $\alpha$, $\phi$ and $s$, in which $0°<\alpha<90°$ and $s\neq 0$. For the generation of surfaces of revolution with apical umbilical points, it is necessary in each case that the highest point of the inclined cam circle lie in the center plane, that is, a vertical line in the center plane is perpendicular to the cam circle at its highest point.

For any point $P(a, b,)$ on the elliptical planar projection of the cam circle onto the principal section, $a$ being the coordinate in the direction of the major axis with the geometrical center of the ellipse as the origin, with values of $a$ ranging from 0 to $r$, and $b$ being the coordinate in the direction of the minor axis with values ranging from 0 to $r \cos \phi$, the value of $s$ necessary for an apical umbilical point at $P(a, b)$ is given by the equation:

$$s=\frac{ab \sin^2 \phi}{(a^2 \cos^4 \phi + b^2)^{1/2}} \quad (3)$$

when $s$ is a finite value, the cam is no longer symemtrical with respect to the center plane, so that two different surfaces of revolution can be generated depending upon whether the cam follower moves along the positive or the negative aspect of the cam circle, both surfaces having the same umbilical point.

With the cam follower proceeding along the positive aspect of the cam circle, the meridian profile of the surface generated will at first decrease in curvature from the umbilical point to the periphery, reaching a minimum corresponding in magnitude to the curvature of the oblate point of the planar projection of the inclined cam, and then increasing in curvature. With the cam follower proceeding along the negative aspect of the cam circle, the meridian profile of the surface generated will at first increase in curvature from the umbilical point to the periphery, reaching a maximum corresponding in magnitude to the curvature of the prolate point of the planar projection of the inclined cam, and then decreasing in curvature.

Referring to FIG. 13 as an example, if $r=10$ cm.
$\alpha=45°$
$\phi=45°$ and $s=2.8868$ cm.

there will be an umbilical point on the surface generated. For values of $s$ other than those given by Equation 3, cup-shaped surfaces of revolution, spindle-shaped surfaces of revolution, and saddle-shaped surfaces of revolution, with and without apical cusps, can be generated. Utilizing the property of the asymmetry of the cam circle with respect to the center plane, it is possible to generate a series of surfaces of revolution having their meridian profiles produced as the cam follower proceeds along a particular portion of the cam circle. As an example, consider a cam circle of radius $r$, inclined at a fixed angle $\phi$. A particular point $P(a, b)$ of the elliptical planar projection of the cam circle lies in the center plane. By simultaneous varying $\alpha$ and $s$, it is possible to maintain point $P(a, b)$ in the center plane while changing the angle between the tangent to point $P(a, b)$ and the work axis (FIG. 11). All the surfaces of revolution in this series will contain the same elliptical arc in the meridian profile, but the tangent to the point $P(a, b)$ for each member of the series will be inclined differently with respect to the work axis.

The series of surfaces illustrated in FIG. 11 represent those obtained when the cam follower moves along one of two aspects of the cam circle. Since the planar projection of the cam circle onto the principal section is asymmetric with respect to the work axis for values of $s$ other than zero, it is possible to generate a second set of surfaces of revolution with each adjustment of the variables by allowing the cam follower to roll along the other aspect of the cam circle.

Surfaces of revolution with apical umbilical points resembling ellipsoids, paraboloids, and hyperboloids can be generated by the method of this invention. These surfaces, as distinguished from conicoids, shall herein be called conicols and will include prolate and oblate ellipsols, parabolols, and hyperbolols in accordance with their resemblance to prolate and oblate ellipsoids, paraboloids, and hyperboloids, respectively. As an example, consider the surface generated with the variables adjusted as follows and the cam follower proceeding along the positive aspect of the cam circle:

$r=10$ cm.
$\phi=45°$
$\alpha=86.3784°$
$s=0.3155$ cm.

The point $P(a, b)$ on the projected ellipse serving as the umbilical point for the conicol is P(9.99, 0.3161) cm.

A point $P_n(a_n, b_n)$ on the projected ellipse can be related as $P'_n(a'_n, b'_n)$ to the conicol generated, with $a'_n$ measured along the axis of symmetry with the umbilical point as origin, and $b'_n$ measured in a direction perpendicular to the axis of symmetry, by means of the folowing transformation formulas:

$$b'_n = b_n \sin \alpha - (a \sin^2 \phi) \cos \alpha \quad (4)$$

$$a'_n = \frac{a-a_n-b'_n \cos \alpha}{\sin \alpha} \quad (5)$$

Using the variables adjusted as in the last example, the conicol generated by the method of this invention, with the cam follower proceeding along the positive aspect of the cam, is an ellipsol resembling an ellipsoid of revolution of eccentricity 0.7990 and focus 2.8107 cm. The apical radius of curvature of the ellipsol is given by Equations 2a, b, and c and is 5.0150 cm. This radius of curvature may be compared to the radius of curvature of the resembling ellipsoid of revolution which is given by the equation:

$$r = f(1+e) \quad (6)$$

and is 5.0507 cm.

Table 1 presents data on the coordinates of points along a meridian section of the ellipsol of the last example, as determined by Equations 4 and 5, for a surface of about 6 cm. diameter, and for comparison, the corresponding values for an ellipsoid which resembles the ellipsol. FIG. 14 illustrates the position of this ellipsol when using this invention.

*Table 1*

| $a$ (cm.) | $b$ (cm.) ellipsol | $b$ (cm.) ellipsoid | $\Delta b$ (cm.) |
|---|---|---|---|
| 0.0468 | 0.6857 | 0.6869 | 0.0012 |
| 0.1207 | 1.1008 | 1.1018 | 0.0010 |
| 0.2008 | 1.4184 | 1.4191 | 0.0007 |
| 0.2841 | 1.6851 | 1.6854 | 0.0004 |
| 0.3695 | 1.9200 | 1.9191 | 0.0001 |
| 0.4564 | 2.1294 | 2.1294 | 0.0000 |
| 0.5444 | 2.3219 | 2.3219 | 0.0000 |
| 0.6333 | 2.5001 | 2.5002 | 0.0001 |
| 0.7230 | 2.6666 | 2.6670 | 0.0004 |
| 0.8133 | 2.8231 | 2.8239 | 0.0008 |
| 0.9041 | 2.9710 | 2.9723 | 0.0013 |
| 0.9954 | 3.1115 | 3.1135 | 0.0020 |

As a second example of a surface of revolution generated by the method of this invention, resembling a conicoid of revolution, consider the surface generated with the variables adjusted as follows:

$$r = 10 \text{ cm.}$$
$$\phi = 45°$$
$$\alpha = 78.6066°$$
$$s = 0.9978 \text{ cm.}$$

The point $P(a, b)$ on the projected ellipse serving as the apex of the conicol is $P(9.9, 0.9975)$ cm. With the cam follower proceeding along the positive aspect of the cam, the conical generated resembles a hyperboloid of revolution, of eccentricity 1.0257, and focus 2.5855 cm. The apical radius of curvature of the hyperbolol is given by Equations 2a, b, and c and is 5.1500 cm. This radius of curvature may be compared to the radius of curvature of the resembling hyperboloid which is 5.2376 cm.

Table 2 presents data on the coordinates of points along a meredian section of the hyperbolol of the last example, as determined by Equations 4 and 5, for a surface of about 6 cm. diameter, and for comparison, the corresponding values for the hyperboloid which resembles the hyperbolol. FIG. 15 illustrates the position of this conicol when using this invention.

These last two examples of conicols demonstrate that surfaces of revolution closely resembling ellipsoids, paraboloids, and hyperboloids can be generated by the method of this invention.

*Table 2*

| $a$ (cm.) | $b$ (cm.) hyperbolol | $b$ (cm.) hyperboloid | $\Delta b$ (cm.) |
|---|---|---|---|
| 0.0171 | 0.4213 | 0.4234 | 0.0021 |
| 0.0535 | 0.7468 | 0.7489 | 0.0021 |
| 0.1000 | 1.0223 | 1.0239 | 0.0015 |
| 0.1530 | 1.2656 | 1.2665 | 0.0009 |
| 0.2106 | 1.4859 | 1.4862 | 0.0003 |
| 0.2718 | 1.6885 | 1.6885 | 0.0000 |
| 0.3358 | 1.8771 | 1.8771 | 0.0000 |
| 0.4021 | 2.0541 | 2.0545 | 0.0004 |
| 0.4704 | 2.2214 | 2.2225 | 0.0011 |
| 0.5404 | 2.3803 | 2.3825 | 0.0022 |
| 0.6119 | 2.5318 | 2.5356 | 0.0039 |
| 0.6849 | 2.6769 | 2.6827 | 0.0058 |
| 0.7586 | 2.8162 | 2.8243 | 0.0081 |
| 0.8336 | 2.9503 | 2.9612 | 0.0109 |
| 0.9096 | 3.0795 | 3.0937 | 0.0142 |

It should be understood that the eccentricity and focus of the resembling conicoids may be altered for a closer approximation of the two surfaces over a specified portion. For example, the level or osculation between the conicol and the conicoid, in the examples given, may be placed somewhat closer or somewhat farther from the apices of the two surfaces than that of the examples, or the conicoid need not osculate the conicol as in the examples but instead may intersect it so that the apical and peripheral portions of the conicoid are external to the conicol while the central portion of the conicol is external to the conicoid.

Conicoids of revolution are useful refracting and reflecting surfaces, as, for example, the high power ophthalmic lenses which utilize ellipsoids and hyperboloids as refracting surfaces. The generation of conicols closely resembling conicoids provides surfaces which may require only a very small amount of subsequent grinding to modify them to the desired conicoid shape or to the shape of a similar type of surface.

Negative surfaces of revolution can be generated by having the cam follower move along a concave circular cam. In order to generate a negative ellipsoid of revolution, it is necessary that the cam follower be of sufficiently small diameter that it is able to roll along the edge of the inclined cam, contacting all points about the apex of the cam.

Referring to FIG. 12, a concave circular cam 191 having a sharpened edge 192 like that described on the convex cam at 190, is mounted in trunnions 193 which have suitable bearings in the bifurcated arms 194 which are rigid with the central cap 34' which is interchangeable with the member 34 previously described in connection with FIG. 1. This fits over the upstanding projection 37a of the vertical column 37 so that all of the adjustments are provided for the member 34 as defined previously. In other words, it may be rotated with respect to the indicia 43 and may have a vertical adjustment by means of the hand wheel 41, and a lateral adjustment by means of the hand wheel 47. The cam may be tilted around the trunnions 193 and locked there by thumb screw 195. This position is indicated by pointer 196, rigid with 193, and reading on angular indicia on plate 197 rigid with bearing cap 198. The workholder 26' has a base portion 26a' for supporting the optical material 26b' on which the surface is to be generated. This workholder is rotated by means of the shaft 27' which rotates by a motor 30 in the same manner as described in FIG. 1. This workholder is suitably supported in the bracket similar to 29 mentioned previously. The grinding tool 50' is preferably formed as shown in FIG. 7 with a toric shaped periphery on which is bonded diamond dust or similar grinding material. The cam follower roller 48' is similar to the cam follower 48 but is of sufficiently small diameter that it will accurately follow the concave cam 191.

It will be understood by those skilled in the art that FIG. 12 is diagrammatic in that the cam follower 48' and the grinding wheel 50' mounted concentrically upon a shaft 49' are in positions similar to those shown in FIG. 1. The drawings are placed as they are to illustrate how the cam follower traveling along the concave cam 191 will generate a negative surface in the optical material 26b'. The shaft 49' is mounted exactly as the shaft 49 described in FIG. 1 so that it may be moved to various positions remaining always parallel to itself.

As an example, consider the negative prolate ellipsoid generated with the variables adjusted as follows:

$$r = 10 \text{ cm.}$$
$$\phi = 45°$$
$$\alpha = 90°$$
$$s = 0$$

With the surface to be generated facing upward, and with the lowest part of the concave cam at about the same vertical level as the work piece, the cam follower moves along either the positive or the negative aspect of the cam. The grinding tool 50′ has a toric edge whose plane of symmetry coincides with the principal section. The radius of the cam follower 48′ is less than $r_{prolate}$ cm., where $r_{prolate}$ is the radius of curvature at the prolate umbilical point. The radius of curvature of a cross section of the toric edge of the grinding tool likewise must not exceed $r_{prolate}$, the limiting radius $r_{prolate}$ resulting in a tool with an edge whose surface is spherical. As the cam follower rolls along the edge of the cam, the grinding tool 50′ rotating rapidly about the tool axis, makes a parallel movement, removing glass from the work piece 26b′ rotating rapidly about the work axis. The surface generated is a negatively curved prolate ellipsoid, of eccentricity .70711 and focus 2.9289 cm.

A negative hyperboloid with a meridian profile identical to that of the positive hyperboloid described in a previous example, can be generated by using a concave circular cam with the variables adjusted as follows:

$r = 10$ cm.
$\phi = 45°$
$\alpha = 78.6066°$
$s = -0.9978$ cm.

The cam follower moves along the negative aspect of the cam with the toric edging grinding tool having its plane of symmetry coinciding with the principal section.

In the examples given so far, positive surfaces of revolution are generated as the cam follower rolls along a convex cam, with the work surface facing upwards, and negative surfaces of revolution are generated as the cam follower rolls along a concave cam, with the work surface facing upwards. Negative surfaces of revolution can be generated with a convex cam if the work surface faces downwards, and positive surfaces of revolution can be generated with a concave cam if the work surface faces downwards.

In the description of the invention thus far, the cam follower and generating tool are of the same outer diameter. This invention also includes combinations of cam followers and grinding tools of different outer diameters.

Another example of a surface of revolution generated by the method of this invention is a spindle-shaped surface having a broad zone lying between two planes perpendicular to the work axis, in which surface there is a substantially constant astigmatism at all points, and in which the two principal powers change regularly and continuously along any meridian section.

Consider the spindle-shaped surface of revolution similar in shape to one of the curves of FIG. 11 and generated with the variables adjusted as follows:

$r = 10$ cm.

$\phi = 44.027°$ $\alpha = 40.349°$ $s = 2.6633$ cm.

Within the broad surface area contained within a zone limited by parallel planes perpendicular to the work axis at 0.2124 cm. and 1.8183 cm. from the apical cusp of the surface, which surface area is more than 40 mm. in length along a meridian, the meridional refracting power of a glass surface of index of refraction 1.523, increases continuously and regularly from 3.8721 diopters at the lower level to 5.0080 diopters at the upper level of the zone, while the transmeridional power at any level between the limits of the zone is always $1.00 \pm 0.011$ diopters greater than the meridional power at that level. Table 3 contains data on this surface, showing the meridional and transmeridional power and their differences at several points along a meridian.

*Table 3*

| Distance from apex of generated surface (cm.) | Distance from axis of symmetry (cm.) | Meridional power (M) (diopters) | Transmeridional power (T) (diopters) | Difference (T−M) (diopters) | Deviation of (T−M) from 1.00 diopter |
|---|---|---|---|---|---|
| 0.2124 | 1.8147 | 5.0080 | 5.9982 | 0.990 | −0.010 |
| 0.4981 | 2.8841 | 4.5615 | 5.5664 | 1.005 | 0.005 |
| 0.8688 | 3.8814 | 4.2426 | 5.2491 | 1.006 | 0.006 |
| 1.3112 | 4.8177 | 4.0196 | 5.0307 | 1.011 | 0.011 |
| 1.8183 | 5.7002 | 3.8721 | 4.8620 | 0.990 | −0.010 |

By appropriate adjustments of the variables, a series of such surfaces of substantially constant astigmatism can be generated, in which the average meridional power and the rate of power change along a meridian, as well as the value of the substantially constant astigmatism, can be varied. The use of many circular cams of different radii makes possible a very large number of such surfaces.

Refracting surfaces of revolution, produced by the method of this invention, of substantially constant astigmatism, in which both principal focal powers increase together in a continuous and regular manner along a meridian, are useful in the formation of lenses for the optical treatment of presbyopia. The said surfaces in combination with coacting spherical and toric surfaces, produce lenses which increase in focal powers in a continuous and regular manner in a generally single direction.

Thus far in the description of this invention, the work axis in the principal section has been limited to the vertical direction. Since the form of the surface generated in dependent in part upon the angle between the work axis and the cam circle axis, it is apparent that it is the relative directions of the work axis and the cam circle axis which are significant. For example, the work axis can be horizontal, and an elliptical torus can be generated by setting $\alpha = 90°$ and $0 < \phi < 90°$. As shown in FIGS. 3 and 4, the workholder 26 can be swung to the dot-dash or horizontal position by removing pin or screw 75 which is shown passing through an opening in collar 76 which is pinned to trunnion 77 about which member 28 rotates in bracket 29. Shaft 27 is then turned 90° to the horizontal position and screw 75 is then passed through the opening in collar 76 and into a second opening 78 in bracket 29 to hold the new position. Skewness would then be measured in a vertical direction. If the cam follower is to be held to the circular edge of the cam by gravity, then it is convenient and necessary to be able to orient the work axis in any direction within the principal section in order to generate certain surfaces. In the example just given, the same elliptical torus could be generated with the work axis vertical and $\alpha = 0°$, if some means is provided for maintaining the cam follower in contact with the cam as the cam follower rolls along the lateral aspect of the cam.

For the generation of elliptical cylinders, the work piece, of optical material or metal, of appropriate dimensions, is held fixed in position straddling the principal section at the approximate level of that portion of the cam circle which is to be contacted by the cam follower. The cylindrical grinding wheel should be at least as long as the cylinder which is to be generated. Both convex and concave elliptical cylinders can be generated, depending upon whether the cam follower rolls along a convex or a concave circular cam. Depending upon the adjustments of the variables, and the dimensions of the work piece, the cylinder portion generated may have a cross section containing either an oblate or a prolate point or both points, or neither point. Non-circular cylinders other than elliptical may be generated by using a grinding tool having a different radius than the cam follower.

Non-circular cylinders other than elliptical may also be generated when a concave cylinder is generated with a convex cam circle, the work surface facing downward, and vice versa.

Templates, made of metal or other materials, of the customary 16, 18, or 20 gauge brass sheet can be produced by the generator of this invention. Such templates are useful as a cam for use by follower-type generators, or to compare surfaces. The template material is placed so that the principal section lies midway between its two surfaces while the work axis divides the template material into approximately equal halves. The generation of the template proceeds in the same manner as the generation of the surface of revolution but without continuously rotating the template material. For those adjustments of the variables in which $\alpha$ is either 0° or 90° and $s=0$, the cam follower rolls along both the positive and the negative aspects of the cam. If $s \neq 0$, then it is necessary to generate one-half of the template as the cam follower proceeds along one aspect of the cam, then manually rotate the template material 180° and fix it again in place, and then repeat the motion of the cam follower.

It is to be understood that all surfaces generated by the method or generator of this invention can be used directly as lens or mirror surfaces, or may be used as cams for cam following generators which generate aspheric surfaces of revolution, or non-circular cylinders. Templates generated by the method of this invention may likewise be used as cams in generators other than my improved generator, which employ cams and cam followers. It is also to be understood that the surfaces generated by the method or generator of this invention may be used as tools and laps for use in generating and grinding surfaces by techniques other than the direct use of my improved generator.

It is also to be understood that all surfaces generated by the use of this inventon, whether in optical material or metal, may be used as molds for molding or casting lenses of optical material.

Up to this point, the invention has been described in terms of a cam circle, whose planar projection is a true ellipse. I have utilized such a hardened steel, relatively wear-free cam with the desired results. The advantage of the circular edged cam is that it can be made to within extremely fine tolerances by commonly available machine tools. The use of a toric edged cam, as shown in end elevation in FIG. 9, provides an additional degree of freedom in the variables available for the production of profiles of surfaces which can be generated. The planar projection of a toric edged cam whose plane of symmetry is inclined to the aforesaid plane differs from an ellipse, so that curves differing from, but resembling, those obtained from ellipses may be impressed upon the work. One obvious example resulting from the use of a toric edged cam is the production of surfaces of revolution with apical umbilical points, when $\alpha=0°$ or 90°, whose meridian profiles differ from ellipses. Surfaces resembling paraboloids and hyperboloids may likewise be produced by this invention when the cam has a toric edge.

A modification of the apparatus disclosed in FIGS. 1 through 3, and in some respects a preferred form of apparatus for use in connection with this invention, is shown in FIG. 16 in elevation. All of the driving equipment at the left-hand end of FIG. 16 is exactly like that described in connection with FIG. 1 and those parts have been given the same reference characters.

The drive shaft 49' has a grinding wheel 200 fixed to turn with the shaft in a position closer to the driving mechanism than that shown in FIG. 1. Farther to the right, a cam roller 201 is mounted on shaft 49' preferably by means of the double bearing arrangement originally discussed in connection with FIG. 5. A generally circular cam 202 is provided to perform the functions originally discussed in connection with the cam 19'. This circular cam is fixed to a manipulating hub 203 having a cylindrical extension 203a which fits rotatably in a suitable socket in an arm 204 so that the cam 202 may be rotated about a diametrical axis, this adjustment being read by pointer 205 on indicia 206 and the adjustment held as desired by a thumb screw 207. The arm 204 is bent at right angles and fixed to a trunnion pin 208, the central axis of which lies on a projected diameter through the circular cam 202. A trunnion pin 208 is mounted in a suitable bearing 209a at the upper end of bracket 209 which in turn is secured to the base 25. The arm 204 may be oscillated about the trunnion pin 208 and this position is read by means of a pointer 210 which moves with arm 204 across indicia carried by a plate 211 which is fixed to the bracket 209. This position is held by means of a thumb screw 212. In this form of the invention, the inclination $\phi$ is read directly on indicia 206 and the azimuth $\alpha$ is read directly on the indicia at 211.

A skewness adjustment is provided in connection with the bracket 209 completely analogous to that described in FIG. 1. The bracket 209 is movable in ways 45' by means of a screw manipulated by hand wheel 47' so as to move the bracket 209 crosswise of the base 25 or at right angles to a vertical plane passing through the axis of the shaft 49'.

The work to be shaped, indicated at 213, is mounted in a workholder 214 which in turn is connected to a vertical shaft 215 rotatably by means of a motor 216. This whole workholding device is held in a bracket 217 which has a stub shaft 218 preferably rotatably mounted in a bracket 219 fixed to the base 25. A pin 220 is provided to hold the work in the position with shaft 215 vertical as shown in FIG. 16 or, alternatively, to rotate the same 90° as previously described and hold the shaft 215 in a generally horizontal position as viewed in FIG. 16.

The apparatus shown and described in connection with FIG. 16 is capable of performing all of the functions described in connection with FIGS. 1 through 3.

It should be understood that in FIGS. 10A through 10F I have shown a workholder 26a, sectioned for metal, upon which is mounted glass or plastic work material to be shaped by the methods of this invention and indicated at 26b. In FIGS. 10G and 10H, the work to be shaped by this invention is indicated at 26 as being metallic in nature and mounted for rotation on the shaft 27. By this means laps, molds or tools may be formed according to the teachings of this invention, after which the laps, molds or tools are utilized directly in the formation of optical surfaces.

Wherever in the specification and claims I have used the term "circular" as applied to the grinding wheel 50 or 200, or the same term as applied to the cam 19', 191 or 202, I intended to include these elements having either truly circular edges or cylindrical and toric edges capable of producing optically useful surfaces following the teachings of this invention.

Wherever in the specification and claims I have spoken of "optically useful surfaces," I intend that term to include both lens and mirror surfaces generated directly on the glass, plastic or other optical material utilizing the teachings of this invention, and also surfaces generated on metal or other hard material which may be be used in other cam following generators to form lens and mirror surfaces, or to form laps, molds or tools of metal and the like which in turn are utilized directly to form lens or mirror surfaces for optical use.

What is claimed is:

1. The method of generating surfaces of revolution having utility as optical lenses and mirrors comprising mounting a work blank for rotation about a work axis, rotating said blank about said work axis, providing a tool having a circularly cylindrical material removing surface, rotating said tool about its axis of symmetry, the tool axis, providing means whereby said tool axis moves parallel to itself and perpendicular to a principal section containing the work axis, while causing said tool axis to follow as a guiding path a portion of a generally circular planar path whose plane is inclined relative to a plane parallel to the principal section of the surface to be generated, the rotating tool straddling said principal section and contacting the work rotating about the work axis, whereby said method is effective for generation of surfaces of prolate and oblate ellipsoids, and spheres, and surfaces resembling prolate and oblate ellipsoids, paraboloids, and hyperboloids of revolution, cup-shaped surfaces of revolution resembling said ellipsoids, and paraboloids, and hyperboloids, and resembling surfaces but with an aptical cusp, cup-shaped surfaces of revolution without an apical umbilical point or cusp, including elliptical toroids in which one of the principal meridians is noncircular, having either a prolate or an oblate elliptical profile, and similar cup-shaped surfaces, saddle-shaped surfaces of revolution with and without any apical cusp including surfaces resembling elliptical toroids in which one of the principal meridians is noncircular, resembling oblate and prolate elliptical profiles.

2. The method as defined in claim 1 wherein said tool has a convex circular or elliptical toric edge, whose outermost diameter lies in the principal section.

3. The method as defined in claim 1 wherein said path is defined by an edge guide of finite thickness which is a torus, whereby said path traces out a space curve lying on the surface of the cam.

4. The method as defined in claim 1 wherein skewness is the distance between the center of the circular path and a center plane, said center plane intersecting normally the principal section along the work axis, the inclination is the angle between the plane of the circular path and the principal section, the azimuth is the angle between a plane perpendicular to the center plane and of the circular path, said path axis being the diameter of the circular path parallel to the principal section about which the circular path has been inclined, and said method including the step of varying one or more of (a) said radius of said tool circular surface, (b) said skewness, (c) said inclination, and (d) said azimuth, whereby to produce a wide variety of surfaces of revolution.

5. The method as defined in claim 4 wherein the portion of the circular path is defined by an edge guide of finite thickness which is a torus of circular cross section of radius $q$, and said method includes the step of varying said last named radius.

6. The method as defined in claim 4 wherein the portion of the circular path is defined by an edge guide of finite thickness which is a torus of elliptical cross section of eccentricity $e$ and focus $f$, and said method includes the step of varying separately or together the eccentricity and focus of said elliptical cross section.

7. The method as defined in claim 4 wherein the work axis can be rotated in the principal section to form an angle with the center plane.

8. The method of generating an optically useful surface including grinding an optically useful material in the plane of the principal section of said surface and controlling said grinding by causing the grinding action to follow as a guiding path a portion of a generally circular planar path whose plane is inclined relative to a plane parallel to the principal section of said surface to be generated.

9. Apparatus for generating optically useful surfaces, including a base, a workholder for holding optically useful material, means mounting said workholder on said base for rotation about a work axis, means for rotating said workholder about said work axis, a circular material removing tool, means mounting said tool on said base for rotation about its axis and in position for its periphery to engage material in said workholder, means for rotating said tool about said tool axis, a cam comprising at least a portion of a generally circular edge of a rigid circular plate, means mounting said cam on said base spaced from said workholder for rotational inclination about a cam diameter as an axis lying in a plane perpendicular to the tool axis, said cam having its axis adjustable for inclination about the center of said cam circular edge as a pivot, a cylindrical roller cam follower mounted with its axis coinciding with said tool axis and rigidly connected to move with said tool axis always perpendicular to said plane of said cam diameter, and means for providing relative positioning movement between said cam and workholder generally parallel to said work axis to engage said optically useful material and said tool when said cam follower engages said cam.

10. Apparatus as defined in claim 9 including means for providing relative positioning movement between said cam and workholder generally perpendicular to a plane intersecting the principal section of the generated surface along the work axis.

11. Apparatus as defined in claim 9 wherein said cam comprises a convex edge of a plate.

12. Apparatus as defined in claim 9 wherein said cam comprises a concave edge of a plate.

13. Apparatus as defined in claim 9 wherein said cam is mounted for pivotal movement about a pin whose axis is a cam diameter at right angles to a plane containing said tool axis, and said pin is mounted for rotation about an axis at right angles to said pin axis.

14. Apparatus as defined in claim 9 wherein said cam is carried by an arm mounted for rotation about a pivot whose axis is parallel to said tool axis and passes through the center of said generally circular cam edge, and said cam is mounted in said arm for rotation about a cam diameter at right angles to said last named axis.

15. Apparatus for generating templates having utility in producing optical surfaces comprising a base, means for mounting a flat sheet of template material on said base with its midplane in the principal section of the optical surface to be generated, a circularly cylindrical material removing tool, means mounting said tool on said base for rotation about its axis and in position for its periphery to engage said template material, means for rotating said tool about said tool axis, a cam comprising at least a portion of a generally circular edge of a rigid circular plate, means mounting said cam on said base spaced from said template material for rotational inclination about a cam diameter as an axis parallel to the plane of said flat sheet of template material for azimuth inclination about a line at right angles to said cam axis and passing through the center of said cam circular edge, a cylindrical roller cam follower mounted with its axis coinciding with said tool axis and rigidly connected to move with said tool axis always perpendicular to the plane containing said cam axis, means for providing relative lateral and vertical positioning movement between said cam and template material in a plane perpendicular to the tool axis, and said template material being adjustable 180 degrees about a central axis thereof, whereby said cam follower may be moved along one aspect of said cam to one side of a central plane passing through said template material axis, and thereafter said template material may be manually rotated 180 degrees followed by removal of material from a second portion of the template material by the movement of the cam follower along the same aspect of the cam.

16. Apparatus for generating elliptical cylinders having utility as optical lenses and mirrors, comprising a base, means for mounting a work blank having a principal section in a fixed position on said base, a tool having a circularly cylindrical material removing surface, means mounting said tool on said base for rotation about a tool axis which always remains parallel to itself, means for rotating said tool about its axis, a suitably inclined and positioned generally circular cam on said frame, a circularly cylindrical cam follower rigidly connected to move with said tool axis, and symmetrical to the tool axis with the same radius as that of the circularly cylindrical tool, and said cam follower mounted for rolling along the edge of said cam.

References Cited by the Examiner

UNITED STATES PATENTS

| | | | |
|---|---|---|---|
| 1,915,144 | 6/1933 | Appleton | 51—101 |
| 2,451,137 | 10/1948 | White | 51—101.1 |
| 2,970,409 | 2/1961 | Seirig et al. | 51—101.1 |
| 2,990,664 | 7/1961 | Cepero | 51—284 |
| 3,066,458 | 12/1962 | Catron et al. | 51—284 |

ROBERT C. RIORDON, *Primary Examiner.*

JOHN C. CHRISTIE, LESTER M. SWINGLE,
*Examiners.*